(12) United States Patent
Bruening

(10) Patent No.: US 9,169,674 B2
(45) Date of Patent: Oct. 27, 2015

(54) LOCKING DEVICE

(71) Applicant: Dr. Ing. h.c.F. Porsche Aktiengesellschaft, Stuttgart (DE)

(72) Inventor: Thomas Bruening, Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 195 days.

(21) Appl. No.: 13/905,188

(22) Filed: May 30, 2013

(65) Prior Publication Data

US 2013/0320692 A1    Dec. 5, 2013

(30) Foreign Application Priority Data

May 31, 2012   (DE) .......................... 10 2012 104 714

(51) Int. Cl.
| | |
|---|---|
| *B60R 7/04* | (2006.01) |
| *E05B 77/06* | (2014.01) |
| *E05B 83/30* | (2014.01) |
| *B60R 21/02* | (2006.01) |
| *E05B 83/28* | (2014.01) |

(52) U.S. Cl.
CPC ............... *E05B 77/06* (2013.01); *B60R 21/026* (2013.01); *E05B 83/28* (2013.01); *E05B 83/30* (2013.01); *Y10T 292/0968* (2015.04); *Y10T 292/1028* (2015.04)

(58) Field of Classification Search
CPC ............ B60R 7/04; B60R 7/06; B60R 21/02; B60R 21/026; E05B 17/20; E05B 55/12; E05B 59/00; E05B 63/14; E05B 83/30; E05C 1/12; E05C 9/02; E05C 9/04; E05C 9/041; E05C 9/10; E05C 9/12; E05C 21/00
See application file for complete search history.

(56) References Cited

U.S. PATENT DOCUMENTS

| | | | | | |
|---|---|---|---|---|---|
| 92,502 | A | * | 7/1869 | Worrell | ........................... 70/120 |
| 1,148,549 | A | * | 8/1915 | Sparks | ..................... 292/169.13 |
| 1,687,388 | A | * | 10/1928 | Rigo | ............................. 70/107 |
| 3,073,143 | A | * | 1/1963 | Eads | .......................... 70/151 R |

(Continued)

FOREIGN PATENT DOCUMENTS

| | | | | |
|---|---|---|---|---|
| AT | 510980 A4 | * | 8/2012 | ................ E05C 9/10 |
| CH | 192804 A | * | 9/1937 | ................ E05C 9/06 |

(Continued)

OTHER PUBLICATIONS

German Search Report of Mar. 8, 2013.

(Continued)

*Primary Examiner* — Glenn Dayoan
*Assistant Examiner* — Paul Chenevert
(74) *Attorney, Agent, or Firm* — Gerald E. Hespos; Michael J. Porco; Matthew T. Hespos

(57) ABSTRACT

A locking device for a cover of a storage compartment in a motor vehicle has at least one bolt element that is displaceable by an actuating handle and, in the locked state, engages in a first storage compartment recess for fixing the cover in a closed position. At least one securing bolt engages in a second storage compartment recess and is actuable via the bolt element so that it only extends out of the second recess if the bolt element already is extended out of the first recess and which thereby secures the cover against undesirably opening in the event of accident-induced accelerations. Increased safety standards can thereby be obtained.

13 Claims, 1 Drawing Sheet

(56) References Cited

U.S. PATENT DOCUMENTS

| | | | |
|---|---|---|---|
| 4,679,416 A * | 7/1987 | Kambic | 70/143 |
| 5,357,652 A * | 10/1994 | Yamada | 16/232 |
| 5,709,111 A * | 1/1998 | Henao | 70/104 |
| 6,669,243 B2 | 12/2003 | Katoh et al. | |
| 7,048,311 B2 | 5/2006 | Sawatani et al. | |
| 7,832,239 B2 | 11/2010 | Kozuka et al. | |
| 8,033,582 B2 | 10/2011 | Sawatani et al. | |
| 2003/0006616 A1* | 1/2003 | Katoh et al. | 292/32 |
| 2003/0209956 A1* | 11/2003 | Bae | 312/324 |
| 2004/0168487 A1* | 9/2004 | Sawatani et al. | 70/145 |
| 2004/0256859 A1* | 12/2004 | Yamada | 292/32 |
| 2005/0225095 A1* | 10/2005 | Geurden | 292/39 |
| 2006/0055196 A1* | 3/2006 | Yamada | 296/37.12 |
| 2007/0123086 A1* | 5/2007 | Matsunaga et al. | 439/310 |
| 2007/0289345 A1 | 12/2007 | Kozuka et al. | |
| 2008/0290685 A1* | 11/2008 | Ohnuki | 296/76 |
| 2009/0038352 A1* | 2/2009 | Yamaguchi et al. | 70/237 |
| 2009/0218361 A1* | 9/2009 | Dammers et al. | 220/817 |
| 2011/0309640 A1 | 12/2011 | Matsubara | |
| 2012/0261937 A1* | 10/2012 | Buchheit | 296/37.12 |
| 2013/0270286 A1* | 10/2013 | Fukui | 220/811 |
| 2014/0008921 A1* | 1/2014 | Shimizu et al. | 292/156 |
| 2015/0008680 A1* | 1/2015 | Suzuki | 292/32 |

FOREIGN PATENT DOCUMENTS

| | | | | |
|---|---|---|---|---|
| CN | 1511732 | | 7/2004 | |
| CN | 101103162 | | 1/2008 | |
| CN | 201786135 | | 4/2011 | |
| CN | 102328622 | | 1/2012 | |
| DE | 371015 C | * | 3/1923 | E05C 1/12 |
| DE | 848611 C | * | 9/1952 | E05B 59/00 |
| DE | 86 23 650.4 | | 11/1986 | |
| DE | 9105310 U1 | * | 7/1991 | E05B 17/00 |
| DE | 92 08 533.4 | | 10/1992 | |
| DE | 10036945 | | 2/2002 | |
| DE | 103 25 099 | | 12/2003 | |
| DE | 102006060098 | | 6/2008 | |
| DE | 10 2008 038 742 | | 2/2010 | |
| DE | 102009012710 | * | 9/2010 | B60R 7/06 |
| DE | 102009052633 | * | 5/2011 | E05C 1/14 |
| DE | 202014102186 U1 | * | 6/2014 | E05C 9/04 |
| EP | 0187104 A1 | * | 7/1986 | E05B 55/12 |
| EP | 1273746 | | 1/2003 | |
| EP | 1925765 A2 | * | 5/2008 | E05B 15/10 |
| EP | 2362041 A1 | * | 8/2011 | E05B 17/20 |
| FR | 803694 A | * | 10/1936 | E05C 9/06 |
| FR | 1412278 A | * | 9/1965 | E05B 37/00 |
| FR | 2817897 A1 | * | 6/2002 | E05B 65/12 |
| FR | 2896207 A1 | * | 7/2007 | B60R 7/06 |
| FR | 2961247 A1 | * | 12/2011 | E06B 5/11 |
| WO | WO 9527115 A1 | * | 10/1995 | E05B 65/12 |
| WO | WO 2013099599 A1 | * | 7/2013 | E05B 65/12 |

OTHER PUBLICATIONS

Chinese Patent Appl. No. 201310216361.5—Office Action issued on Apr. 17, 2015.

* cited by examiner

LOCKING DEVICE

CROSS REFERENCE TO RELATED APPLICATIONS

This application claims priority under 35 USC 119 to German Patent Appl. No. 10 2012 104 714.6 filed on May 31, 2012, the entire disclosure of which is incorporated herein by reference.

BACKGROUND

1. Field of the Invention

The invention relates to a locking device for a cover of a storage compartment in a motor vehicle, and particularly a pivotable cover of a glove compartment. The invention also relates to a cover for a storage compartment, and particularly a glove compartment of a motor vehicle comprising a locking device of this type, and also to a motor vehicle with a storage compartment closeable by such a cover.

2. Description of the Related Art

Locking devices for a cover of a storage compartment in a motor vehicle, and particularly for a pivotable cover of a glove compartment, are well known and frequently have two parallel bolt elements that are connected forcibly to each other in an opposed manner via a gearwheel and which, in the locked state, engage in opposite storage compartment recesses. The bolt elements can be moved out of the storage compartment recesses by an actuating handle, for example a rotary knob or pushbutton so that the cover of the storage compartment can be opened. However, the cover of the storage compartment should not open unintentionally in the event of increased accelerations, as occur, for example, in the case of accidents or when an airbag is triggered. Such an unintended opening could result in objects stored therein flying into the passenger compartment and putting the passengers at risk.

The invention therefore is concerned with reliably fixing of a cover of a storage compartment in the closed position, in particular in the event of increased accelerations that occur, for example, in the case of accidents.

SUMMARY OF THE INVENTION

The invention relates to a locking cover on storage compartments in motor vehicles, such as a locking cover on a glove compartment. The locking cover has at least one displaceable bolt element that is displaceable by an actuating handle. In the locked state, the bolt element engages in a first storage compartment recess to fix the cover in the closed position. The locking cover also has a securing element for preventing undesired opening of the cover in the event of increased accelerations, for example when an airbag is triggered or in the case of an accident. The securing element includes at least one additional securing bolt that engages in a second storage compartment recess and is actuable via the bolt element to move out of the second recess only if the bolt element already is moved out of the first recess. As a result, the cover can be secured against undesirably opening in the event of accident-induced accelerations. The actuating handle is operated during normal opening of the locking device and causes the bolt element to move out of the first storage compartment recess. The securing bolt also is moved upon displacement of the bolt element. Thus, the cover is unlocked and can be opened. An accident induces comparatively high accelerations, but the mere movement of the bolt element out of the first storage compartment receptacle is not sufficient to open the cover, i.e. to unlock the locking device. On the contrary, the at least one securing bolt also has to be moved out of the second storage compartment receptacle to unlock the locking device. Therefore, even in the event of increased accelerations, the cover of the storage compartment can be fixed reliably in the closed position. The locking device of the invention therefore significantly increases protection of people in the motor vehicle.

The locking device preferably has two bolt elements that are connected to each other in an opposed manner via a force transmitting gearwheel. The two bolt elements, in the locked state, engage in opposite first storage compartment recesses. The actuating handle acts either on the gearwheel or on one of the two bolt elements to move the locking elements. This double locking increases security against undesirable opening of the locking device. More particularly, the high accelerations that could open the locking device act only in one direction and therefore at maximum either one or the other bolt element is extended out of the associated first storage compartment recess. However, simultaneous extension of the two bolt elements out of the opposite storage compartment recesses is considerably more difficult and less likely. The securing bolt can be parallel to one of the two bolt elements. Thus, it is conceivable for two securing bolts to be provided for engaging in two opposite storage compartment recesses. This virtually rules out an undesired opening of the cover even in the event of very high accelerations.

A driver contour preferably is provided on the bolt element. The driver contour interacts with a mating driver contour on the associated securing bolt if the bolt element is not in the associated first storage compartment recess. Actuation of the securing bolt therefore is brought about only in the event of actuation of the associated bolt element. Each bolt element initially is moved out of the first storage compartment recess in response to operating the actuating handle for opening the locking device. Then and only then, the driver contour of the locking device grasps the mating driver contour of the securing bolt and moves the securing bolt out of the second storage compartment recess. The locking device of the invention therefore is unlocked in two stages, namely, a first stage by movement of the bolt element out of the first storage compartment recess and, a second stage by movement of the securing bolt out of the second storage compartment recess. The driver contour and the associated mating driver contour can be designed as simple brackets and can be produced integrally or unitarily with the associated bolt element or with the associated securing bolt.

A first spring device may be provided for pretensioning the bolt element into the closed position and/or a second spring device may be provided for pretensioning the securing bolt into the closed position. A very wide variety of configurations are conceivable for the first and/or second spring device. For example, a single spring device may pretension both the bolt element and the securing bolt into the closed positions thereof. Alternatively, a first spring device may pretension the bolt element and a second spring device may pretension the securing bolt. The first and/or second spring device may fix the associated bolt element or securing bolt in the closed position merely by closing the cover without separate actuation of the locking device. For this purpose, the bolt element and the securing bolt are beveled at the respective storage compartment recesses. Thus, the bolt element and securing bolt are pushed counter to the spring force of each spring device as the cover is moved toward the closed position. However, the spring forces will urge the bolt element and securing bolt into the associated recess when the cover is closed sufficiently for the bolt element and securing bolt to align with the respective recesses.

Further features and advantages of the invention emerge from the appended claims, from the drawings and from the associated description.

The features mentioned above and those explained below can be used in the respectively stated combination, and also in different combinations or on their own without departing from the scope of the invention.

Preferred exemplary embodiments of the invention are illustrated in the drawings and are explained in more detail in the description below, wherein the same reference numbers refer to identical or similar or functionally identical shaped parts.

DETAILED DESCRIPTION OF THE PREFERRED EMBODIMENTS

Figure 1:
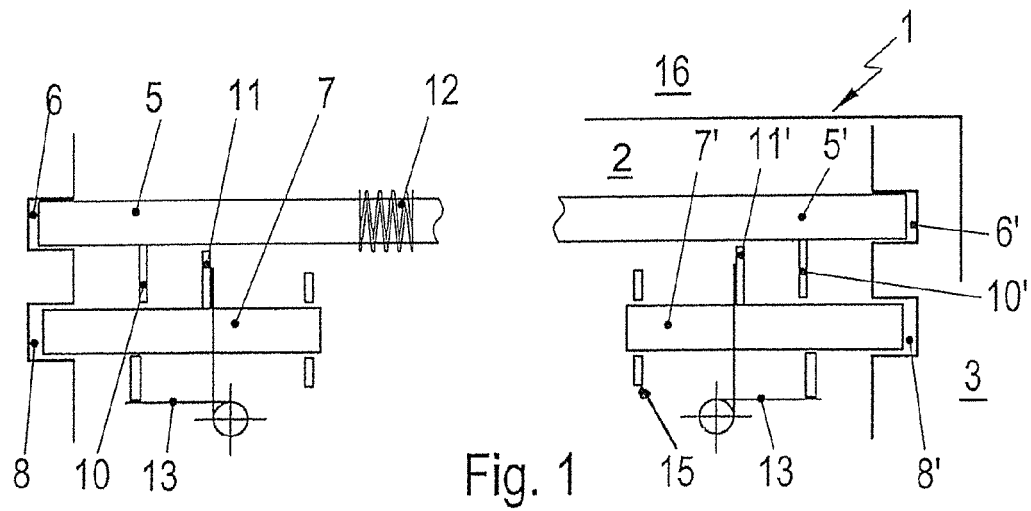
FIG. 1 shows a locking device according to the invention in a closed position.
Figure 2:
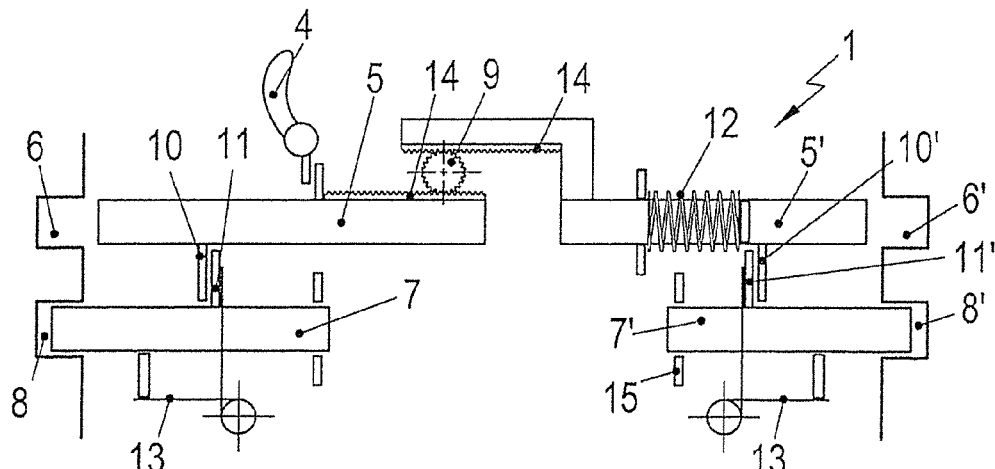
FIG. 2 shows the locking device of FIG. 1, but with the bolt element open.
Figure 3:
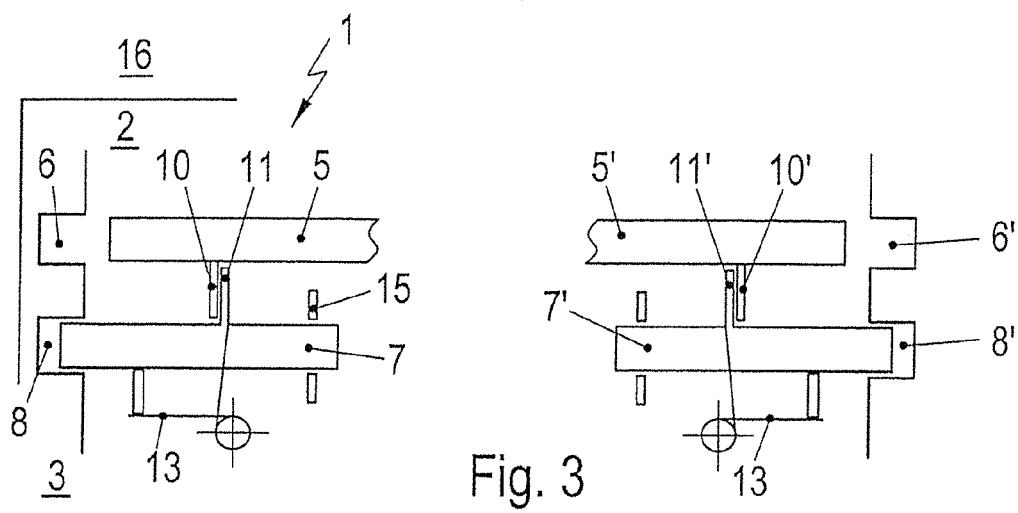
FIG. 3 shows an illustration as in FIG. 2, but with the securing bolt additionally open.

A locking device according to the invention is identified by the numeral 1 in FIGS. 1 to 3. The locking device 1 is for a pivotable cover 2 of a glove compartment or other storage compartment in a motor vehicle 3. The locking device 1 has at least one bolt element 5 that is displaceable by means of an actuating handle 4 (FIG. 2). The bolt element 5, in the locked state, engages in a first storage compartment recess 6 and thereby fixes the cover 2 in the closed position. Higher accelerations occur, for example, in the event of triggering an airbag (not shown) or in the case of accidents. At least one securing bolt 7 is provided to fix the cover 2 in the closed position in the event of these higher accelerations. The securing bolt, in the locked state, engages in a second storage compartment recess 8 and is actuable via the bolt element 5 so that the securing bolt 7 extends out of the second recess 8 only if the bolt element 5 already is extended out of the first recess 6. According to FIGS. 1 to 3, two bolt elements 5, 5' are connected to each other in an opposed manner via a gearwheel 9 (FIG. 2) and, in the locked state, engage in opposite first storage compartment recesses 6 and 6'. The actuating handle 4 of FIG. 2 acts on the bolt element 5, but similarly could bring about a rotation of the gearwheel 9 and therefore a movement of the forcibly coupled bolt elements 5, 5'. Two securing bolts 7, 7' are provided in each FIGS. 1 to 3 and are oriented in a mirror-inverted manner with respect to one another. The respective securing bolts 7, 7' run parallel to the associated bolt elements 5, 5'. However, a locking device 1 having only a single bolt element 5 and an associated securing bolt 7 may be sufficient.

Each bolt element 5, 5' has a driver contour 10, 10' that interacts with a mating driver contour 11, 11' on the associated securing bolt 7, 7' if the bolt element 5, 5' is not in the associated first recess 6, 6', as illustrated in FIGS. 2 and 3.

A first spring device 12 pretensions the bolt element 5, 5' into the closed position, and a second spring device 13 pretensions each securing bolt 7, 7' into the closed position. Spring devices 12, 13 that act both on each bolt element 5, 5' and on each securing bolt 7, 7' or merely on one of the two elements are conceivable. According to FIGS. 1 to 3, the bolt elements 5, 5' are in the form of bolt bars. According to FIG. 2, each of the bolt element 5 and the bolt element 5' has a rack contour 14 facing the gearwheel 9. The rack contours 14 couple the bolt element 5, 5' forcibly to the gearwheel 9.

The cover 2 also has a holding device 15 for at least partially holding a component of the locking device 1. As noted above, the locking device 1 can be provided in a passenger compartment 16 of a motor vehicle 3, and in particular in the region of a cover 2 for a glove compartment.

FIG. 1 illustrates the locking device 1 in the locked state with the bolt elements 5, 5' and the securing bolts 7, 7' engaged in the respectively associated recesses 6, 6' and 8, 8'. The actuating handle 4 is actuated to unlock the locking device 1 and to open the cover 2. More particularly, actuating the actuating handle 4 moves the bolt elements 5, 5' out of the associated storage compartment recesses 6, 6'. Two bolt elements 5, 5' and two securing bolts 7, 7' are discussed below and above. However, a single bolt element 5 and a single securing bolt 7 are sufficient to implement the invention.

The bolt elements 5, 5' are extended out of the associated storage compartment recesses 6, 6', and then the driver contour 10, 10' on each bolt element 5, 5' enters into contact with the mating driver contour 11, 11' on the securing bolt 7, 7'. Further movement of the bolt elements 5, 5' displaces each securing bolt 7, 7' until the securing bolts 7, 7 move out of the storage compartment recesses 8, 8'', as illustrated according to FIG. 3. In this state, the locking device 1 is unlocked completely and the cover 2 can be opened. The cover 2 simply can be pressed into the closed position. As a result, the bolt elements 5, 5' and the securing bolts 7, 7' each are pretensioned by the spring force of the spring devices 12, 13 to such an extent that they latch in the associated storage compartment recesses 6, 6' and 8, 8'. For easier closing of the cover 2, ends of the bolt element 5, 5' and securing bolts 7, 7' that face the respective recesses 6, 6' and 8, 8' can be beveled, but this cannot be seen in the sectional illustrations in FIGS. 1 to 3.

The locking device 1 of the invention prevents unintentional opening of the cover 2 in the event of increased accelerations, such as those that occur, for example, in the event of accidents or when an airbag is triggered. Thus, the safety of the people traveling in the motor vehicle 3 is increased, since they are not put at risk by objects that were previously stored in the storage compartment flying around.

What is claimed is:

1. A locking device for a cover of a storage compartment in a motor vehicle, comprising:
    at least one bolt element engageable in a first storage compartment recess for fixing the cover in a closed position;
    an actuating handle configured for displacing the at least one bolt element from the first storage compartment recess;
    a first spring device disposed for pretensioning the bolt element into the closed position thereof;
    at least one securing bolt engageable in a second storage compartment recess and being sequentially actuable via the bolt element so that the at least one securing bolt extends out of the second recess only if the bolt element already is extended out of the first recess for securing the cover against undesirably opening in the event of accident-induced accelerations; and
    a second spring device disposed for pretensioning the securing bolt toward the closed position thereof and for moving the securing bolt to the closed position thereof concurrently with or after movement of the bolt element into the closed position thereof.

2. The locking device of claim 1, wherein the at least one bolt element comprises two bolt elements forcibly connected to each other in an opposed manner and, in a locked state, being engaged in opposite first storage compartment recesses, the actuating handle being configured to cause the two bolt elements to move simultaneously.

3. The locking device of claim 2, wherein the at least one securing bolt is parallel to the bolt elements.

4. The locking device of claim 2, wherein the at least one securing bolt comprises two opposite securing bolts, each of the securing bolts interacting with one of the bolt elements.

5. The locking device of claim 1, wherein the at least one bolt element comprises two bolt elements forcibly connected to each other in an opposed manner via a gearwheel and which, in a locked state, engage in opposite first storage compartment recesses, the actuating handle being configured to act on at least one of the two bolt elements or on the gearwheel.

6. The locking device of claim 5, wherein the at least one securing bolt is parallel to the bolt element.

7. The locking device of claim 5, further comprising a driver contour provided on the bolt element and a mating driver contour arranged on the associated securing bolt, the driver contour interacting with the mating driver contour if the bolt element is not in the associated first recess.

8. The locking device of claim 5, wherein the at least one securing bolt comprises two opposite securing bolts, each of the securing bolts interacting with one of the bolt elements.

9. The locking device of claim 5, wherein the bolt element is in the form of a bolt bar and has a rack contour facing the gearwheel.

10. A cover for a storage compartment of a motor vehicle, comprising a holding device and a locking device held by the holding device, the locking device including;
    two bolt elements forcibly connected to each other in an opposed manner via a gearwheel and which, in a locked state, engage in opposite first storage compartment recesses for fixing the cover in a closed position;
    an actuating handle configured to act on at least one of the two bolt elements or on the gearwheel for displacing the bolt elements from the first storage compartment recesses;
    at least one first spring device disposed for pretensioning the two bolt elements into the closed position thereof;
    at least one securing bolt engageable in a second storage compartment recess and being sequentially actuable via at least one of the bolt elements so that the at least one securing bolt extends out of the second recess only if the bolt elements already is extended out of the first recess for securing the cover against undesirably opening in the event of accident-induced accelerations; and
    at least one second spring device disposed for pretensioninq the securing bolt toward the closed position thereof and for moving the securing bolt to the closed position thereof concurrently with or after movement of the bolt elements into the closed positions thereof.

11. A motor vehicle with a passenger compartment in which a storage compartment that is closeable by the cover of claim 10.

12. A locking device for a cover of a storage compartment in a motor vehicle, comprising:
    first and second bolt elements engageable in a first and second primary recesses for fixing the cover in a closed position;
    an actuating handle configured for displacing the bolt elements from the primary recesses;
    at least one first spring device disposed for pretensioninq the two bolt elements into the closed position thereof;
    first and second securing bolts engageable in first and second secondary recesses and being sequentially actuable via the bolt elements so that the securing bolts extend out of the secondary recesses only if the bolt elements already are out of the bolt element recesses for securing the cover against undesirably opening in the event of accident-induced accelerations;
    two second spring devices disposed for pretensioning the securing bolt toward the closed position thereof and for moving the securing bolts to the closed position thereof concurrently with or after movement of the bolt elements into the closed positions thereof.

13. The locking device of claim 12, wherein the securing bolts are parallel to the bolt elements.

* * * * *